US010362348B2

(12) United States Patent
Shahmoon et al.

(10) Patent No.: US 10,362,348 B2
(45) Date of Patent: *Jul. 23, 2019

(54) SYSTEM AND MONITORING OF VIDEO QUALITY ADAPTATION

(71) Applicant: Verint Americas Inc., Alpharetta, GA (US)

(72) Inventors: Guy Shahmoon, Cote St-Luc (CA); Guy Jacubovski, Even Yehuda (IL)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,901

(22) Filed: Jul. 30, 2018

(65) Prior Publication Data

US 2018/0338172 A1    Nov. 22, 2018

Related U.S. Application Data

(63) Continuation of application No. 14/280,000, filed on May 16, 2014, now Pat. No. 10,110,940.

(60) Provisional application No. 61/825,156, filed on May 20, 2013.

(51) Int. Cl.
*H04N 21/2662* (2011.01)
*H04N 21/238* (2011.01)
*H04N 21/2343* (2011.01)
*H04N 21/24* (2011.01)

(52) U.S. Cl.
CPC ....... *H04N 21/2662* (2013.01); *H04N 21/238* (2013.01); *H04N 21/2343* (2013.01); *H04N 21/2402* (2013.01)

(58) Field of Classification Search
CPC .............. H04N 21/2385; H04N 21/24; H04N 21/2402; H04N 21/2662; H04N 21/2343
See application file for complete search history.

(56) References Cited

U.S. PATENT DOCUMENTS

| 2008/0267213 A1 | 10/2008 | Deshpande |
| 2010/0265833 A1 | 10/2010 | Ou et al. |
| 2011/0268428 A1 | 11/2011 | Chen et al. |
| 2013/0031266 A1 | 1/2013 | Gilson |
| 2013/0166731 A1 | 6/2013 | Yamanaka et al. |

*Primary Examiner* — Joshua D Taylor
(74) *Attorney, Agent, or Firm* — Christopher M. Scherer; DeWitt LLP

(57) ABSTRACT

Systems and method of video quality adaptation include acquiring video data to be streamed. An available bandwidth on a communications network is determined. A determined playback speed is determined based upon a bitrate of the video data to be streamed and the available bandwidth on the communications network. The video data is decoded to produce decoded video data which is encoded at the determined playback speed to produce encoded video data. The encoded video data is streamed across the communications network.

13 Claims, 4 Drawing Sheets

SYSTEM AND MONITORING OF VIDEO QUALITY ADAPTATION

CROSS-REFERENCE TO RELATED APPLICATION

The present application is a continuation of U.S. patent application Ser. No. 14/280,000, filed on May 16, 2016, which Application claims priority of U.S. Provisional Patent Application No. 61/825,156, filed on May 20, 2013, the contents of which are hereby incorporated herein by reference in their entire.

BACKGROUND

The present disclosure is related to the field of data transmission. More specifically, the present disclosure is related to streaming video transmission.

When streaming video, it is common that the available bandwidth is lower than the original video bitrate. When streaming must be performed in real time, the video data is transcoded to reduce the resolution so that the streamed bitrate of the video will fit the available bandwidth. A reduction of the video bitrate reduces resolution and the quality of the streaming video is reduced compared to the original video.

BRIEF DISCLOSURE

An exemplary embodiment of a method of video quality adaptation includes acquiring video data to be streamed. An available bandwidth on a communications network is determined. A determined playback speed is determined based upon a bitrate of the video data to be streamed and the available bandwidth. The video data is decoded to produce decoded video data. The decoded video data is encoded to produce encoded video data at the determined playback speed. The encoded video data is streamed on the communications network.

In an additional exemplary embodiment of a method of video quality adaptation, the method includes acquiring video data to be streamed, the video data having a bitrate. An available bandwidth on a communications network is determined. The bitrate of the video data to be streamed is compared to the available bandwidth on the communications network. If the available bandwidth is greater than the bitrate of the video data to be streamed, the video data is streamed across the communications network. If the available bandwidth is less than the bitrate of the video data, a determined playback speed is determined based upon the bitrate of the video data and the available bandwidth. The video data is decoded to produce decoded video data. The decoded video data is encoded to produce encoded video data at the determined playback speed. The encoded video data is streamed across the communications network.

An exemplary embodiment of a video streaming system with video quality adaptation includes a computer readable medium upon which video data to be streamed is stored. The video data to be streamed has a bitrate. A remote video player is configured to present streaming video data received across the communications network. A bandwidth monitor determines an available bandwidth across the communications network. A processor acquires the video data to be streamed from the computer readable medium and receives the available bandwidth determined by the bandwidth monitor. The processor determines a playback speed based upon the bitrate of the video data to be streamed and the available bandwidth. The processor decodes the video data into decoded video data and encodes the decoded video data at the determined playback speed to produce encoded video data. The processor streams the encoded video data across the communications network to the remote video player.

DETAILED DISCLOSURE

Figure 1:
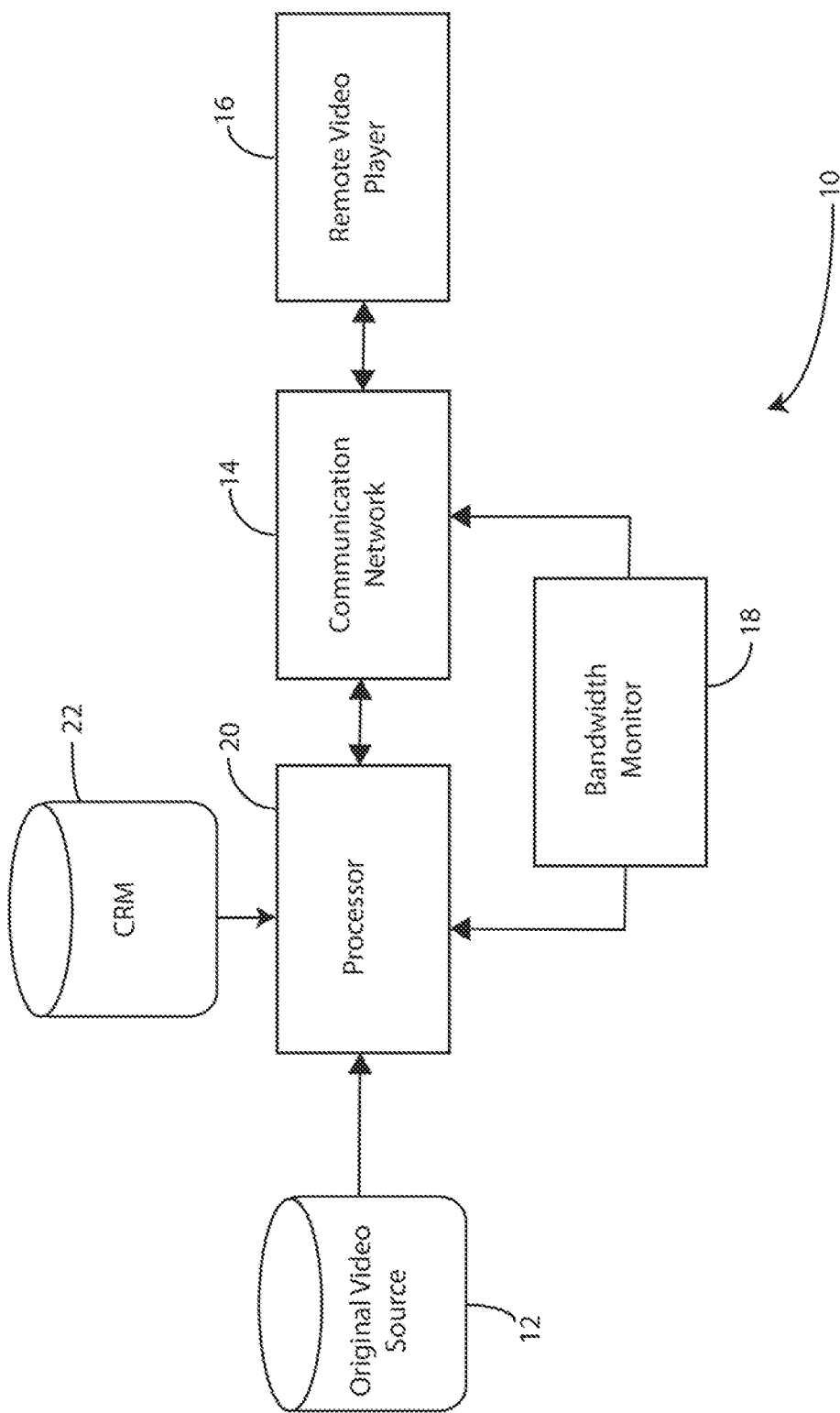
FIG. 1 is a system diagram of an exemplary system, for streaming video.

FIG. 1 is a system diagram that depicts an embodiment of a system 10 for streaming video. The system 10 includes an original video source 12 which is exemplarily a computer readable medium upon which original video data is stored. In embodiments, the original video data is digital video data and in some embodiment may be, but is not limited to high-definition video data. It is generally understood that the quality of the video stored at the original video source as measured by video bitrate can be greater than an available bandwidth as measured by bitrate in a communication network 14 across which the video is to be streamed to a remote video player 16. The video bitrate can be determined as the resolution per frame of video times the number of frames per second at which the video is played. The communication network 14 may be a local network, a wide area network, and may employ Ethernet, wireless, or cellular data communication technologies, or other technologies as would be recognized by one of ordinary skill in the art. A bandwidth monitor 18 measures available bandwidth in the communication network 14 for which data can be transferred to the remote video player 16. In an exemplary embodiment, the bandwidth monitor 18 may produce a numerical indication of available bandwidth exemplarily in the form of megabits per second of data transfer. In embodiments, the bandwidth monitor 18 may provide a single indication of available bandwidth at the outset of streaming a video, or may continuously or periodically monitor the available bandwidth in alternative embodiments such that the streaming video data may be processed in accordance with the present disclosure. In an exemplary embodiment, the bandwidth monitor 18 operates to execute a transfer of a test packet (or packets) of data across the communication network 14 to the remote video player 16 or other similar location. Based upon a time required to complete this transfer, the bandwidth monitor produces an indication available bandwidth on the communication network 14. It will be recognized that this is merely exemplary of a way in which a bandwidth monitor may operate and a person of ordinary sill in the art will recognize other ways and forms of bandwidth monitoring that may be used with embodiments as disclosed herein. In a still further exemplary embodiment, the bandwidth monitor 18 may measure the transfer of the actual video data, rather than test packets of data. In embodiments the bandwidth monitor 18 may be a standalone device, or a part of another device. Alternately, the processor 20, described in further detail herein, may execute software with computer program instructions to also operate to provide the functionality of the bandwidth monitor 18.

Figure 2:
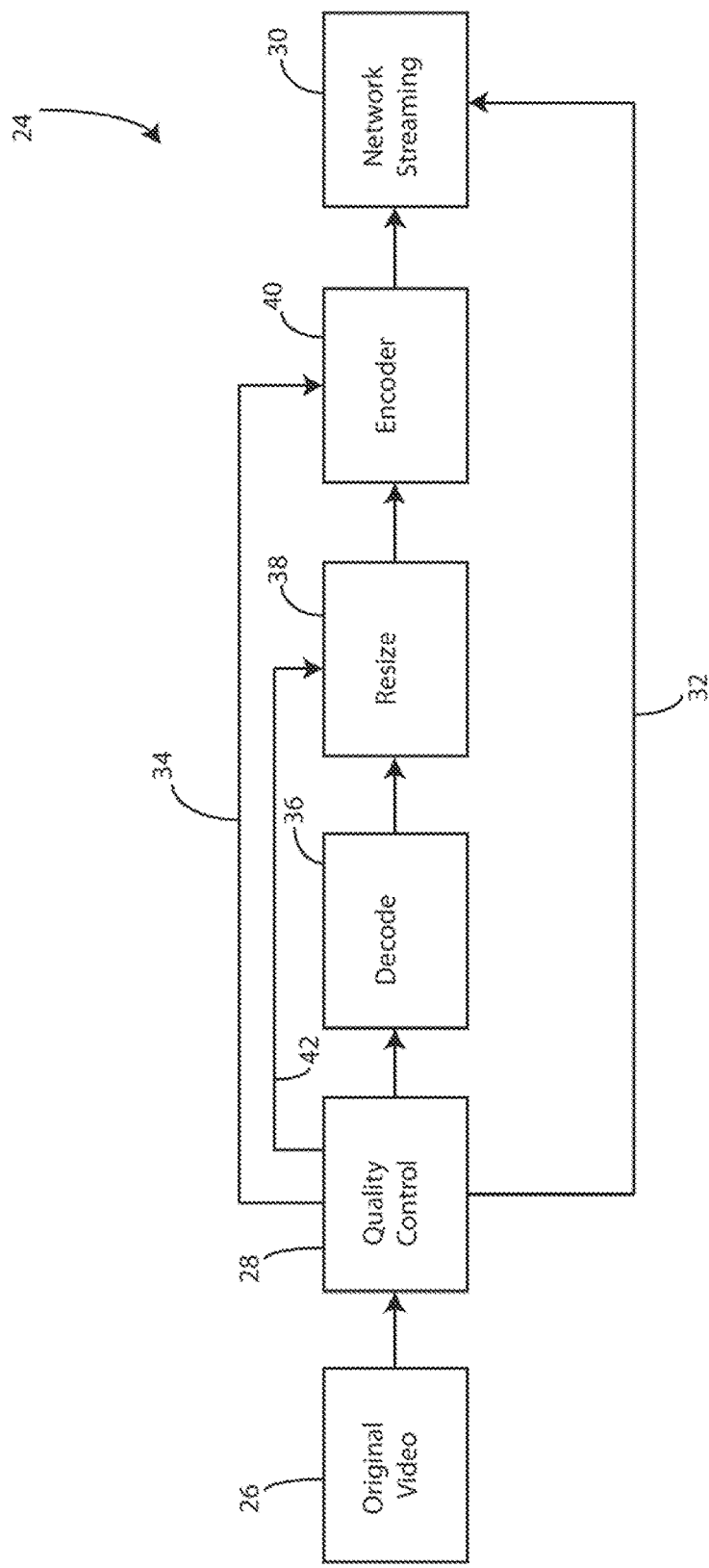
FIG. 2 is a block diagram of functions or software modules executed by a processor in carrying out embodiments of streaming video as disclosed herein.
Figure 4:
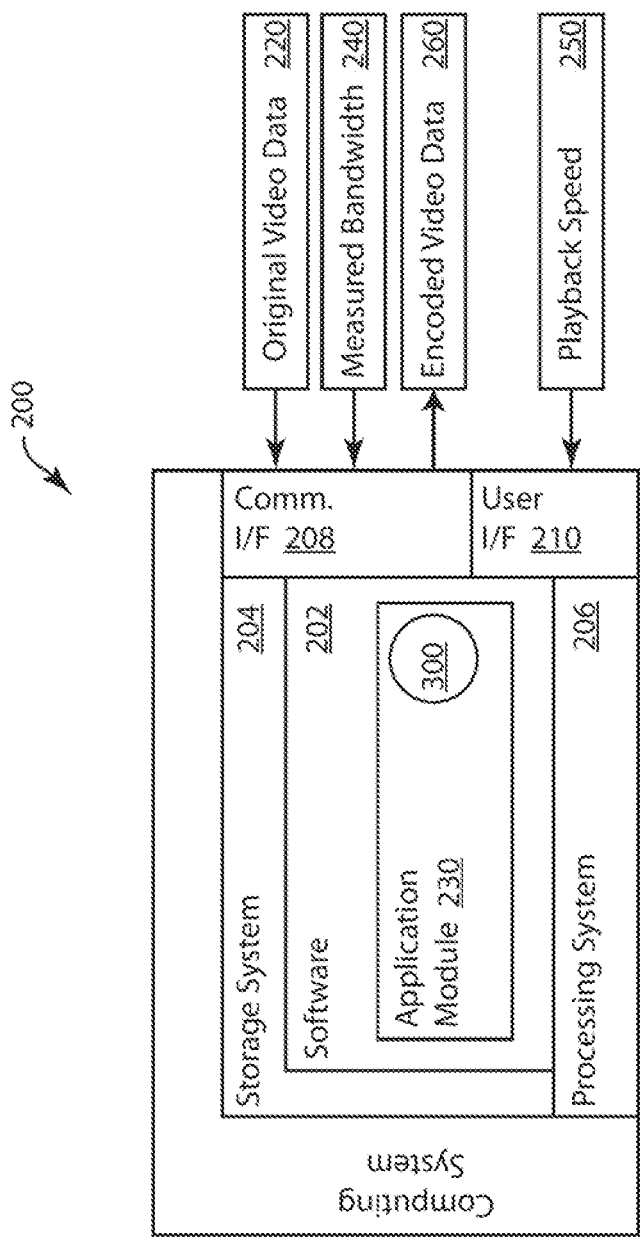
FIG. 4 is a system diagram of an exemplary embodiment of a system for adapting video quality for streaming.

The processor 20 either includes or is communicatively connected, to a computer readable medium 22 programmed with computer readable code that upon execution by the processor 20 causes the processor 20 to perform the operations and functions as described herein. FIG. 2 is a block diagram 24 of exemplary functions and/or computer program modules executed by the processor 20 in exemplary embodiments. FIG. 4 is a system diagram of an exemplarily embodiment of a computer processing system 200 as maybe used to implement the processor 20 of FIG. 1. In further reference to FIGS. 1 and 2 original video 26 is received from the original video source 12 by the processor 20. The processor 20 first conducts a quality control module 28 whereby the available bandwidth for streaming on the communication network 14 is determined such as by the bandwidth monitor 18. In one exemplary embodiment the quality control module 28 is used to select an appropriate playback speed (which may be represented as frames per second) as will be described in further detail herein such that the original video can be streamed using the available bandwidth without a reduction in video quality. If the combination of the bitrate of the original video as represented by the original video resolution and the original video playback speed is less than the available network bandwidth than the processor 20 can pass the original video along to network streaming 30 on the communication network 14, such as is represented by reference arrow 32. If a reduction in the playback speed is required to maintain the original video resolution, then the quality control module 28 provides an indication of the new playback speed as represented by reference arrow 34 to an encoder 40. The new playback speed may be represented as frames/second or as otherwise described in further detail herein. The processor may then operate a decoding module 38 to decode the original video and then re-encode the video with the encoder 40 at the reduced playback speed before the re-encoded video is streamed on the network at 30.

In an alternative embodiment the quality control module 28 may receive a defined playback speed (not depicted), exemplarily such as selected by a user input. This user defined playback speed is provided to the encoder 40. In a non-limiting embodiment, the use may provide exemplary input selections of fill speed, half speed, or double speed. The quality control 22 also determines if the user defined playback speed requires resizing or reduction in video resolution such as to enable video streaming at the requested playback speed. If no reduction is required, them the original video is re-encoded at the user defined playback speed as described above, or the original video data is passed through to the communication network 14 if the original video meets the user-specified playback speed and available bandwidth.

If execution of the quality control module 28 determines that a reduction in the streamed video resolution is required to achieve the playback speed as selected by the user input, then the quality control module 28 provides the determined reduced resolution as represented by reference arrow 42 to a resizing module 28. The processor operates a decode module 36 to decode the original video. The original video is resized at 38 using the determined new resolution 42. The resized video is then re-encoded by the encoder 40 at the user defined playback speed and transferred for network streaming 30 across the communication network 14 to the remote video player 16 for streaming playback at the selected playback speed and determined video resolution.

As a non-limiting example, an original video may have a resolution of 1280×720 and a playback speed of 30 frames/second for a bitrate of 3 Mb/s. The available bandwidth is measured to be 3 Mb/s. In this basic example, the quality control passes the original video at full speed and at full resolution to the network for streaming. If the available bandwidth exemplarily decreases to 1 Mb/s, then the quality control would determine that the available bandwidth is now one-third of the previous available bandwidth and the quality controller can determine that the playback speed of the original video must also be reduced to one-third of the original playback speed such that the original video resolution can be maintained, albeit at a slow motion replay.

In an alternative embodiment, the user may provide an input or request that rather than playback at one-third of the original video playback speed, the user would prefer that the video is played back at one-half the original playback speed. An increase in playback speed over that calculated by the quality control module causes the quality control module to recalculate the required resolution. The video resolution is recalculated within the bounds of the available bandwidth such that the resolution is maximized for the requested playback speed. In the present example, if the available bandwidth is 1 Mb/s and the user has selected one-half original playback speed, then the original video must be resized from the 1280×720 resolution available at a one-third playback speed to a 960×640 resolution available at a one-half playback speed.

By the above example, it can be seen that the present system and methods provide a solution for network streaming that maintains optimum video quality and provides on the fly video streaming potentially across a variable available bandwidth.

In embodiments, the quality control performed by the quality control module can either be automatedly established at the content side of the communication network such that the playback speed is controlled with respect to the available bandwidth in order that the default of a maximized video quality is maintained. In an alternative embodiment, the playback speed is controlled by input by the user or person viewing the streamed video content while the quality of the video is initially adjusted relative to the available bandwidth but at the discretion of the user, a new playback speed may be selected which results in the quality control increasing or decreasing the streamed video resolution in relation to the user selected playback speed. As a general example, the relationship between these values is video resolution×playback speed=streaming bitrate. Thus, the quality control seeks to maximize the video resolution within the fixed or bounded values of playback speed and streaming bitrate.

Figure 3:
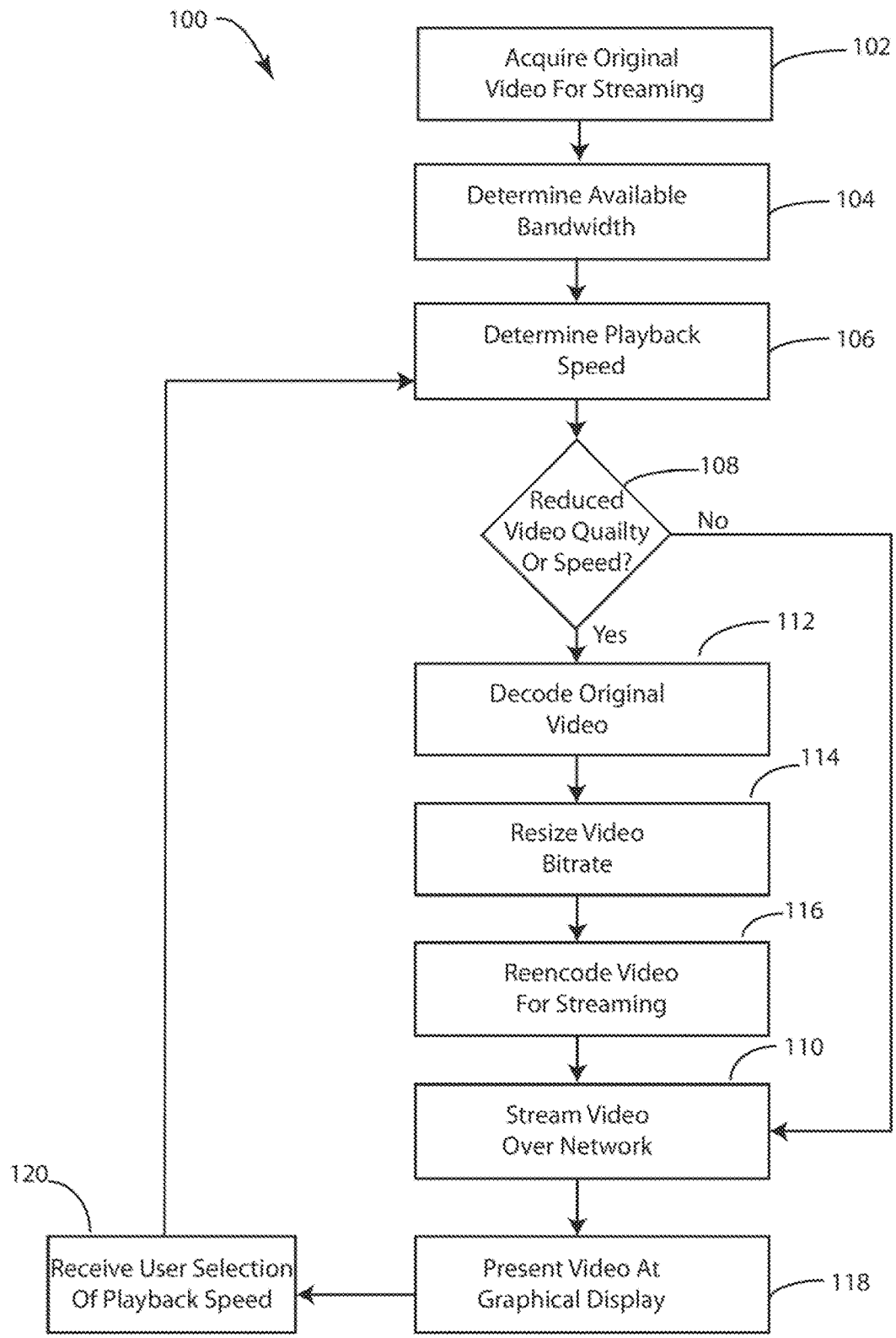
FIG. 3 is a flow chart that depicts an exemplary embodiment of a method of adapting video quality for streaming.

FIG. 3 is a flow chart that depicts an embodiment of a method of streaming video 100. At 102 the original video is acquired from a computer readable medium for streaming to a remote video player across a communication network. At 104 an available bandwidth on the communication network to the remote video player is determined. The available bandwidth to the remote video player can be a fixed or variable bandwidth depending upon characteristics of the communication network itself, but generally through various techniques the available bandwidth is a quantifiable number at any point in time, such as may be used in execution of the method 100 as disclosed herein.

At 106 a playback speed is determined. In one embodiment, the playback speed is represented as video frames per second. In another embodiment, the playback speed is represented as a decimal and determined to be the available streaming bitrate divided by the original video bitrate. If the playback speed is determined to be 1.0 then the original video is able to be streamed at full quality and full speed. If the playback speed is determined to be greater than 1, then the available streaming bandwidth exceeds that required to stream the original video at full quality and full speed. If the playback speed is determined to be less than 1.0, then the playback speed must be reduced to that decimal percentage of the original playback speed in order to maintain the quality of the original video in streaming.

At 108 a determination is made whether or not the original video quality or speed must be reduced in accordance with the determination above at 106. If the playback speed determined at 106 is 1.0 or greater, then no reduction in video quality or speed is required and the method proceeds to 110 where the original video is streamed over the communications network.

If a reduction in video quality or speed is required at 108, then the original video is decoded at 112 and if the video quality is to be reduced, then the video is resized to reduce the video bitrate at 114 and the resized video is re-encoded at 116 for streaming. At the re-encoding at 116, the resized video is encoded at the determined playback speed and the re-encoded video is streamed over communication network at 110.

It is to be noted that the resizing of the video to reduce the bitrate at 114 is performed in response to an identified need to reduce video quality, as will be described in further detail herein, while the re-encoding of the video for streaming at 116 encodes the video at the new determined playback speed if such a modified payback speed is required. At 118 the streamed video is presented at a graphical display at the remote video player.

In accordance with an embodiment of the method 100 as disclosed herein, at 120 a user selection of a playback speed may be received. Further to the example as identified above, the determined playback speed may be one-third of the original playback speed and the user viewing these streamed video may wish to increase the playback speed exemplarily to one-half the original playback speed. This received user section of the playback speed at 120 is then used at 106 as the determined playback speed, which if less than the playback speed originally determined at 106, would still result in streaming of the full quality original video, while if the received user selection of playback speed at 120 is a greater speed then the playback speed determined at 106, then the video quality must be reduced in order to maintain streaming at the increased playback speed. In such an embodiment the original video is resized to a determined reduced bitrate such that the video can be re-encoded at the user selected playback speed and streamed over the communication network for presentation at the graphical display of the remote video player.

In exemplary embodiments, a combination of the adjusted playback speed to maintain streaming quality of the original video in the case of insufficient available bandwidth can further be used with buffering techniques such that original video quality is maintained but presented at a reduced playback speed at a bitrate less than the available bitrate, such that additional buffered video content can be streamed to the remote video player such that at a later point in presenting the video, the playback speed can be increased while maintaining the video quality.

In still further exemplary embodiments, the user may use embodiments as disclosed herein in order to adjust the video quality of streaming video content. If the user is viewing streaming video at a reduced video quality but at full speed and the user desires to view some or all of a duration of the streaming video at a higher quality, the user can input a command to reduce the playback speed and the user receives streamed video at a higher quality up to the original video quality with reductions in playback speed. Some exemplary embodiments may find particular utility in the field of video monitoring or surveillance wherein a user accesses surveillance video data and depending upon the review or purposes of the use various trade-offs between video playback speed and video playback resolution may be desired and may change throughout the course of streaming video data playback.

FIG. 4 is a system diagram of an exemplary embodiment of a computing system 200 for adapting video quality for streaming. The computing system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 300, and FIGS. 1-3.

Although the computing system 200 as depicted in FIG. 4 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in executing program instructions. Examples of processing system 206 include general purpose central processing units, application specific processors, and logic devices, as well as any other type of processing devices, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210. In an exemplary embodiment, the user interface 210 may operate to receive a user input or selection of a playback speed 250 in accordance with the execution of embodiments of the method 300.

As described in further detail herein, the computing system 200 receives and transmits data through the communication interface 208. In embodiments, the communication interface 208 operates to send and/or receive data to/from other devices to which the computing system 200 is communicatively connected. In the computing system 200, original video data 220 is received. The original video data is exemplarily stored at a computer readable medium which may be remotely located form the computing system. The original video data 220 may be exemplarily received by the computing system 200 after a user makes a selection of the video data to be streamed. As described above, the computing system 200 receives a measured bandwidth 240, exemplarily from a bandwidth monitor. The computing system 200 executes the application module 230 to carry out the method 300 as described herein. Thus, the computing system 200 processes the original video data 220 according to the measured bandwidth 240 and the received playback speed 250 to produce encoded video data 260. The encoded video data 260 is transmitted from the communication interface 208 either directly to a graphical display network or across a communications network to another device to present the video data.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of video quality adaptation, the method comprising:
   acquiring video data encoded to play at a first playback speed and a first resolution, based on a first bitrate;
   determining that an available bandwidth on a communications network is insufficient to stream the video data at the first playback speed and first resolution, wherein the available bandwidth corresponds to a second bitrate that is less than the first bitrate, wherein the second bitrate is the current maximum bitrate the available bandwidth allows;
   calculating a second playback speed that enables the video data to stream over the communications network at the first resolution and at a third bitrate that is less than the second bitrate, the second playback speed being slower than the first playback speed;
   wherein the calculating includes periodically monitoring the available bandwidth on the communications network and updating, based on the monitoring, the second playback speed;
   wherein the periodic monitoring includes transmitting the video data and calculating the available bandwidth based on the variable time required to transmit the video data;
   decoding the video data;
   encoding the video data, based on the results of the periodic monitoring, to play at the second playback speed and the first resolution;
   streaming at the third bitrate, over the communications network, the video data encoded to play at the second playback speed and the first resolution; and
   utilizing the remaining available bandwidth to stream additional video data at the first playback speed and the first resolution such that the additional video data creates a buffer of video data, such that at a later time the video data played will be the buffered video data that is encoded at the first playback speed and the first resolution.

2. The method of claim 1, further comprising receiving a user-selected playback speed.

3. The method of claim 2, further comprising:
   determining that the user-selected playback speed is slower than the second playback speed; and
   streaming, over the communications network, the video data encoded to play at the user-selected playback speed and the first resolution.

4. The method of claim 2, further comprising:
   determining that the user-selected playback speed is faster than the second playback speed; and
   streaming, over the communications network, the video data encoded to play at the user-selected playback speed and a second resolution lower than the first resolution.

5. The method of claim 1, further comprising calculating a second resolution to enable the video data to stream over the communications network at a user-selected playback speed.

6. A method of video quality adaptation, the method comprising:
   acquiring video data having a first playback speed and a first resolution, based on a first bitrate;
   determining an available bandwidth on a communications network, the available bandwidth corresponding to a second bitrate that is less than the first bitrate, wherein the second bitrate is the current maximum bitrate the available bandwidth allows;

calculating a second playback speed that enables the video data to stream over the communications network at a third bitrate that is less than the second bitrate and play at the first resolution, wherein the calculating includes periodically monitoring the available bandwidth on the communications network and updating, based on the monitoring, the second playback speed;

wherein the periodic monitoring includes transmitting the video data and calculating the available bandwidth based on the variable time required to transmit the video data;

encoding the video data to play at the second playback speed and the first resolution;

streaming at the third bitrate, over the communications network, the video data encoded to play at the second playback speed and the first resolution; and utilizing the remaining available bandwidth to stream additional video data at the first playback speed and the first resolution, wherein the additional video data creates a buffer of video data, such that at a later time the video data played will be the buffered video data that is encoded at the first playback speed and the first resolution.

7. The method of claim 6, further comprising receiving a user-selected playback speed.

8. The method of claim 7, further comprising:
determining that the user-selected playback speed is faster than the second playback speed; and
streaming, over the communications network, the video data encoded to play at the user-selected playback speed and a second resolution lower than the first resolution.

9. The method of claim 6, further comprising calculating a second resolution to enable the video data to stream over the communications network at a user-selected playback speed.

10. A video streaming system with video quality adaptation, the system comprising:
a computer readable medium upon which video data to be streamed is stored, the video data having a first playback speed and a first resolution, based on a first bitrate;
a remote video player programmed to present streaming video data received across a communications network;
a bandwidth monitor programmed to determine an available bandwidth across the communications network, wherein the determination includes periodic monitoring by transmitting the video data and calculating the bandwidth based on the variable time required to transmit the video data; and
a processor programmed to
acquire the video data from the computer readable medium,
receive, from the bandwidth monitor, a second bitrate characterizing the available bandwidth, wherein the second bitrate is the current maximum bitrate the available bandwidth allows,
calculate a second playback speed that would enable the video data to stream over the communications network at a third bitrate that is less than the second bitrate and play at the first resolution, based on the available bandwidth,
decode the video data,
encode the video data, based on the results of the periodic monitoring, to play at the second playback speed and the first resolution,
stream at the third bitrate, over the communications network to the remote video player, the video data encoded to play at the second playback speed and the first resolution, and
utilize the remaining available bandwidth to stream additional video data to the remote video player at the first playback speed and the first resolution, wherein the additional video data creates a buffer of video data, such that at a later time the video data played will be the buffered video data that is encoded at the first playback speed and the first resolution.

11. The video streaming system of claim 10, wherein the processor is further programmed to:
receive a user-selected playback speed;
determine that the user-selected playback speed is faster than the second playback speed; and
stream, over the communications network to the remote video player, the video data encoded to play at the user-selected playback speed and a second resolution lower than the first resolution.

12. The video streaming-system of claim 11, wherein the user-selected playback speed and the second resolution combine to equal the second bitrate.

13. The method of claim 10, wherein the processor is further programmed to calculate a second resolution to enable the video data to stream over the communications network at a user-selected playback speed.

* * * * *